(12) United States Patent
Gocz et al.

(10) Patent No.: US 9,010,785 B2
(45) Date of Patent: Apr. 21, 2015

(54) PNEUMATIC SUSPENSION SYSTEM OF A MOTOR VEHICLE AND METHOD

(71) Applicant: WABCO GmbH, Hannover (DE)

(72) Inventors: Reinhard Gocz, Seelze (DE); Michael Haverkamp, Hannover (DE); Johann Lucas, Sehnde (DE); Andreas Rutsch, Hannover (DE); Thomas Stellmacher, Stadthagen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/364,438

(22) PCT Filed: Dec. 5, 2012

(86) PCT No.: PCT/EP2012/005001
§ 371 (c)(1),
(2) Date: Jun. 11, 2014

(87) PCT Pub. No.: WO2013/091776
PCT Pub. Date: Jun. 27, 2013

(65) Prior Publication Data
US 2014/0333038 A1 Nov. 13, 2014

(30) Foreign Application Priority Data
Dec. 21, 2011 (DE) .......................... 10 2011 121 755

(51) Int. Cl.
*B60G 17/052* (2006.01)
*B60G 17/056* (2006.01)

(52) U.S. Cl.
CPC .......... *B60G 17/052* (2013.01); *B60G 17/0523* (2013.01); *B60G 17/0528* (2013.01);
(Continued)

(58) Field of Classification Search
CPC .. B60G 17/052; B60G 17/523; B60G 17/525; B60G 17/526; B60G 17/528; B60G 2202/152; B60G 2500/2012; B60G 2500/2021; B60G 2500/203; B60G 2500/204; B60G 2500/30; B60G 2500/302

USPC ........ 180/41; 280/5.514, 6.151, 6.157, 6.159, 280/124.16
See application file for complete search history.

(56) References Cited

U.S. PATENT DOCUMENTS 4,693,493 A * 9/1987 Ikemoto et al. ............... 280/5.51
4,809,957 A * 3/1989 Schonfeld et al. ......... 267/64.11
(Continued)

FOREIGN PATENT DOCUMENTS

DE  2 056 634   5/1972
DE  42 43 577 B4  6/1994
(Continued)

*Primary Examiner* — Paul N Dickson
*Assistant Examiner* — Laura Freedman
(74) *Attorney, Agent, or Firm* — Kramer Levin Naftalis & Frankel LLP (57) ABSTRACT

A suspension system includes spring bellows that are associated with pneumatic springs of vehicle axles, are connectable by lines having level control valves to a main pressure line, and can be shut off with respect thereto. The main line is connectable by valves alternately to a compressed air source and a sink, and can be shut of with respect thereto. To set different air mass flow rates when air is supplied to/removed from the bellows, the bellows of the springs at least on a vehicle axle or side can be connected to the main line in parallel with the connecting lines, at least by further connecting lines having further level control valves, and can be shut off with respect thereto. The further valves have nozzle cross-sectional surfaces the same size as the other level control valves. Chokes are downstream of the further valves in the ventilation direction, the cross-sectional surfaces thereof being smaller than the nozzle cross-sectional surfaces of the further valves.

14 Claims, 7 Drawing Sheets

(52) U.S. Cl.
CPC . *B60G2500/2012* (2013.01); *B60G 2500/2021* (2013.01); *B60G 2500/203* (2013.01); *B60G 2500/204* (2013.01); *B60G 2202/152* (2013.01); *B60G 2500/30* (2013.01)

(56) References Cited

U.S. PATENT DOCUMENTS

| | | | | |
|---|---|---|---|---|
| 4,852,906 A | * | 8/1989 | Buma et al. | 280/5.507 |
| 4,858,895 A | * | 8/1989 | Buma et al. | 267/64.16 |
| 5,015,006 A | * | 5/1991 | Takehara et al. | 280/5.51 |
| 5,116,077 A | * | 5/1992 | Karnopp et al. | 280/5.502 |
| 5,135,065 A | * | 8/1992 | Kawasaki et al. | 180/41 |
| 5,176,391 A | * | 1/1993 | Schneider et al. | 280/6.153 |
| 5,288,102 A | * | 2/1994 | Machida et al. | 280/6.157 |
| 5,322,321 A | * | 6/1994 | Yopp | 280/6.158 |
| 5,499,845 A | * | 3/1996 | Geiger et al. | 280/6.157 |
| 5,601,307 A | * | 2/1997 | Heyring et al. | 280/6.157 |
| 5,769,400 A | * | 6/1998 | Holzl et al. | 267/64.16 |
| 6,168,171 B1 | * | 1/2001 | Shono et al. | 280/5.507 |
| 6,332,623 B1 | * | 12/2001 | Behmenburg et al. | 280/124.16 |
| 6,726,224 B2 | * | 4/2004 | Jurr et al. | 280/5.514 |
| 6,817,600 B2 | * | 11/2004 | Ocker et al. | 267/274 |
| 7,552,932 B2 | * | 6/2009 | Matern et al. | 280/124.16 |
| 7,761,205 B2 | * | 7/2010 | Onuma et al. | 701/36 |
| 8,190,328 B2 | * | 5/2012 | Jovers et al. | 701/37 |
| 8,474,797 B2 | * | 7/2013 | Sprengel et al. | 267/64.28 |
| 8,777,246 B2 | * | 7/2014 | Meier | 280/124.16 |
| 8,814,190 B2 | * | 8/2014 | Becher et al. | 280/124.16 |
| 2013/0247553 A1 | * | 9/2013 | Frank et al. | 60/407 |
| 2013/0255787 A1 | * | 10/2013 | Frank et al. | 137/1 |
| 2013/0257007 A1 | * | 10/2013 | Frank et al. | 280/124.161 |
| 2013/0276899 A1 | * | 10/2013 | Frank et al. | 137/1 |
| 2013/0318954 A1 | * | 12/2013 | Frank et al. | 60/407 |
| 2014/0312590 A1 | * | 10/2014 | Stabenow, Uwe | 280/124.16 |
| 2014/0319788 A1 | * | 10/2014 | Gomann et al. | 280/5.508 |
| 2014/0346748 A1 | * | 11/2014 | Harla et al. | 280/124.16 |

FOREIGN PATENT DOCUMENTS

| | | |
|---|---|---|
| DE | 198 35 491 C2 | 2/2000 |
| DE | 100 04 880 A1 | 8/2001 |
| DE | 102 23 405 B4 | 12/2003 |
| DE | 10 2005 017 590 B3 | 6/2006 |
| DE | 10 2005 032 219 A1 | 1/2007 |
| KR | 2002-0074860 | 10/2002 |

* cited by examiner

PNEUMATIC SUSPENSION SYSTEM OF A MOTOR VEHICLE AND METHOD

FIELD OF THE INVENTION

The present invention generally relates to a pneumatic suspension system of a motor vehicle and control method.

BACKGROUND OF THE INVENTION in contrast to conventional steel spring suspensions, pneumatic suspension systems have significant advantages and are therefore increasingly being used on commercial vehicles, such as trucks and buses, and also oh passenger cars, preferably heavy passenger cars, such as luxury sedans and SUVs. Thus, a pneumatic suspension system allows level control independent of loading since the current state of loading can, in each case, be compensated for by adapting the bellows pressure in the spring bellows of the pneumatic springs. Owing to the progressive spring characteristics of the pneumatic springs, a pneumatic suspension system likewise offers particularly reliable contact between the roadway and the wheels and a comfortable response during the compression and rebound of the wheels.

Another advantage of pneumatic suspension systems is that the ground clearance of the relevant road vehicles can be modified if required, e.g., increased for off-road use and reduced for high-speed travel on the freeway. In the case of commercial vehicles, there is the additional factor that the vehicle body can be lowered or adjusted to a suitable height for loading and unloading. Thus, the vehicle chassis of a truck or trailer with pneumatic suspension can he lowered to set down an interchangeable platform, for example, and raised again to pick it up. To facilitate loading and unloading, the loading surface of a truck can likewise be adjusted to the level of a loading ramp by lowering or increasing the bellows pressure at the rear axle. In the case of buses with pneumatic suspension, the vehicle body on the passenger loading/unloading side (curbside) can be lowered by releasing the compressed air from the spring bellows on the curbside and then raised again by filling the spring bellows in order to make it easier for the passengers to get in and out.

The basic construction of a pneumatic suspension system of the general type under consideration is known from DE 198 35 491 C2 and DE 100 04 880 A1, for example.

The pneumatic suspension system described in DE 198 35 491 C2 has a plurality of spring bellows, which can be connected by means of connection lines that are each provided with a level control valve to a main pressure line, and can be shut off with respect to same. The level control valves are each designed as 2/2-way solenoid switching valves, which are closed in a first position (rest position) and open in a second position (actuated position). The main pressure line can be supplied with air via a supply line provided with a compressor, an air dryer and a check valve, and can be vented via a vent line branching off between the compressor and the air dryer and provided with a discharge valve. The discharge valve is designed as a pressure-controlled 2/2-way switching valve, which is closed in a first position (rest position) and open in a second position (actuated position). The pilot valve associated with the discharge valve is designed as a 3/2-way solenoid switching valve, which connects the pneumatic control line to the environment in a first position (rest position) and to the main pressure line in a second position (actuated position).

In a first embodiment according to FIG. 1 of DE 198 35 491 C2, a throttle valve designed as a pressure-controlled 2/2-way switching valve, which is closed in a first position (rest position) and open with a throttle cross-sectional area in a second position (actuated position), and the pneumatic control input of which is connected to the pneumatic control line of the discharge valve, is arranged in a line segment parallel to the check valve. While air is being supplied to the main pressure line, the throttle valve is open, as is the discharge valve owing to the pilot valve, wherein the throttle cross-sectional area limits the air mass flow and causes it to expand ahead of the air dryer, thereby increasing moisture absorption by the compressed air from the air dryer and thus improving the regeneration thereof. In a second embodiment according to FIG. 2 of DE 198 35 491 C2, the discharge valve and the throttle valve are combined in a common pressure-controlled 4/2-way switching valve.

The pneumatic suspension system according to DE 100 04 880 A1 differs from that of DE 198 35 491 C2 in that a check valve is arranged between the compressor and the air dryer and, instead of the check valve and throttle valve being connected in parallel, a restrictor is arranged in the supply line after the dryer in the air admission direction. Moreover, the discharge valve then has a pressure limiting function and a check valve, which is activated in the second position (actuated position). Moreover, the pneumatic suspension system according to DE 100 04 880 A1 has a pressure accumulator, which can be connected by means of a connection line provided with an accumulator valve to the main pressure line and can be shut off with respect to same. In a first embodiment according to FIG. 1 of DE 100 04 880 A1, a high-pressure discharge valve designed as a 2/2-way solenoid switching valve is additionally provided, by means of which, if required, compressed air is discharged into the environment from the main pressure line while bypassing the air dryer. In a second embodiment according to FIG. 2 of DE 100 04 880 A1, a throttle valve with a controllable throttle cross-sectional area is arranged after the discharge valve in the venting direction. The throttle valve enables the air mass flow, which flows off into the environment during the venting of spring bellows, to be limited. As a result, the lowering speed of the vehicle body, e.g., at one vehicle axle or on one vehicle side, is controlled.

In Applicant's DE 42 43 577 B4, in contrast, a pneumatic suspension system of a motor vehicle is described in which a first control valve designed as a 3/2-way solenoid switching valve, by means of which a plurality of connection lines, each provided with a level control valve and leading to the e spring bellows of an associated pneumatic spring, can be connected to a pressure source, e.g., a pressure accumulator, or a pressure sink, e.g., the environment, has arranged after it in the air admission direction a second control valve, which is designed as a 2/2-way solenoid switching valve. In a first position (rest position), the second control valve is open without throttling and, in a second position (actuated position), is open with a throttle cross-sectional area. By actuation of the second control valve, the pneumatic suspension system can thus be switched between rapid admission of air to and venting of air from the spring bellows and slow air admission to and venting of air from the spring bellows. However, the throttle of the second control valve can be configured for only a number of spring bellows, i.e., for slow admission of air to and venting of air from two or four spring bellows for example.

Finally, DE 102 23 405 134 discloses a pneumatic suspension system that largely corresponds to that described in DE 198 35 491 C2, but, as in the pneumatic suspension system according to DE 100 04 880 A1, a pressure accumulator is provided, which can be connected by means of a connection line provided with an accumulator valve to the main pressure line and can be shut off with respect to same. In a first embodiment according to FIG. 1 of DE 102 23 405 B4, the discharge valve is designed as a 2/2-way solenoid switching valve, and in that a throttle valve with a controllable throttle cross-sectional area is arranged in the line segment parallel to the restrictor instead of a switching valve provided in one position with a constant throttle cross-sectional area. By means of the limited possibility of adjustment of the throttle cross-sectional area, the air mass flow flowing in or out via the air dryer during admission of air to and venting of air from spring bellows can be regulated and hence the raising and lowering speed of the vehicle body can be controlled locally, e.g., at one vehicle axle or on one vehicle side. However, a throttle valve with a controllable throttle cross-sectional area is a complex component involving a high outlay on production and is correspondingly expensive and fault prone.

Fundamentally, therefore, a problem with known pneumatic suspension systems is that the air mass flow during admission of air to and venting of air from the spring bellows and hence the raising and lowering speed of the vehicle body can be controlled or varied only inadequately. Whereas only relatively low air mass flows are required in the level control function and to compensate for leakage losses, relatively high air mass flows are passed into the relevant spring bellows or discharged therefrom for rapid lowering and raising of the vehicle body. In the hitherto known pneumatic suspension systems, this is possible to only an inadequate extent and in combination with functional disadvantages or functional limitations or only with a high equipment outlay.

SUMMARY OF THE INVENTION

Generally speaking, it is an object of the present invention to provide a pneumatic suspension system of a motor vehicle that is inexpensive to produce and provides a simple way of enabling (and controlling) different flow speeds of the air mass flow during admission of air to and venting of air from the spring bellows of pneumatic springs to be set.

As described in great detail hereinafter, in one embodiment of the present invention, the spring bellows of the pneumatic springs arranged at least on one vehicle axle or on one vehicle side can be respectively connected to a main pressure line in parallel with first connection lines having first level control valves at least by means of a second connection line provided with a second level control valve, and can be shut off with respect to the main pressure line. The second level control valves of the relevant spring bellows each have nozzle cross-sectional areas of the same size as the first level control valves. A restrictor is arranged after each of the second level control valves in the air admission direction, the cross-sectional areas of the restrictors being smaller than the nozzle cross-sectional area of the relevant second level control valve.

A pneumatic suspension system for a motor vehicle includes a plurality of spring bellows associated with the pneumatic springs at least on one vehicle axle. The spring bellows can be connected by means of connection lines that are each provided with a level control valve to a main pressure line, and can be shut off with respect to same. The main pressure line can be connected by means of at least one associated valve, e.g., a switching valve and/or a check valve, alternately to a compressed air source, which can be formed by a compressor and/or a pressure accumulator for example, and a compressed air sink, i.e., the ambient air, and can be shut off with respect to same.

In order to simply and economically set different air mass flows during admission of air to and venting of air from the spring bellows of pneumatic. springs and, hence, set different raising and lowering speeds of the vehicle body at the relevant vehicle axle or vehicle side, the spring bellows of the pneumatic springs arranged at least on one vehicle axle or on one vehicle side, ideally the spring bellows of all the pneumatic springs present, can be respectively connected to the main pressure line in parallel with the first connection lines at least by means of a second connection line provided with a second level control valve and can be shut off with respect to the main pressure line. Moreover, the second level control valves of the relevant spring bellows can each have nozzle cross-sectional areas of the same size as the first level control valves, and a restrictor can be arranged after each of the second level control valves in the air admission direction, the cross-sectional areas or nominal sizes of the restrictors being smaller than the nozzle cross-sectional area of the relevant second level control valve.

The two respective level control valves can be 2/2-way solenoid switching valves or pressure-controlled 2/2-way switching valves that can be controlled by a pilot valve, which can be of identical construction and can thus be produced in large numbers and at correspondingly low cost. The restrictors and compressed air lines do not represent a significant cost factor either.

Equipping the spring bellows of pneumatic springs of a motor vehicle with connection lines and level control valves arranged in parallel, does not necessarily have to be performed on all the pneumatic springs. On the contrary, it is expedient to equip only the spring bellows of those pneumatic springs on which different raising and lowering speeds of the vehicle body are actually required, e.g., in the case of a truck with a fixed body, only on the pneumatic springs of the rear axle for adjustment of the loading surface edge during loading and unloading and, in the case of a bus, only on the curbside pneumatic springs for rapid lowering and raising of the entrances at bus stops.

Since the air mass flow flowing through the second connection lines when the second level control valves are open is, in each case, determined by the restrictors arranged after the valves, the air mass flow flowing to a spring bellows of a pneumatic spring or flowing away from the bellows can thus be controlled in three stages by opening only the respective first level control valve, only the respective second level control valve or, in each case, both level control valves.

To reduce the assembly effort, at least the two level control valves associated with the spring bellows of a single pneumatic spring and the restrictor arranged after the relevant second level control valve can be arranged in a common valve block. In such case, at least one double valve block can be used. However, the level control valves associated with the spring bellows of several pneumatic springs and further switching valves can also be combined in a common valve block. Thus, it is advantageous if, for example, the four level control valves associated with the two spring bellows of the two pneumatic springs of a vehicle axle are arranged in a common fourfold valve block or, including the accumulator valve of a pressure accumulator arranged close to the vehicle axle, in a common fivefold valve block.

According to a preferred embodiment, the valve block is provided with a connection cap, which has a connection bore direct connection of the respective first level control valve to the associated spring bellows, an end cap instead of a connection bore for direct connection of the respective second level control valve to an associated spring bellows, and a restrictor embodied as a restriction bore for connection, in a manner restricted on the bellows side, of the respective second level control valve to the connection bore of the respective first level control valve. The inventive valve arrangement can thus be implemented in a particularly simple and low-cost manner by virtue of the fact that, while the valve block is essentially unchanged, only a connection cap that is normally also provided with a connection bore for the respective second level control valve is replaced by the inventive connection cap, which is provided with the restriction bore and the end cap for the respective second level control valve.

To dehumidify the compressed air delivered into the main pressure line from the environment by means of a compressor, an air dryer can be arranged after the compressor in the air admission direction. The air dryer is generally of regenerative design and, for this purpose, contains regenerable silicate granules, for example, which can absorb 20% of their weight in water, and can return this moisture to the dry compressed air during flow in the venting direction. In order to improve dehumidification of the compressed air in the air dryer while the main pressure line is being supplied with air and to improve regeneration of the air dryer during the venting of the main pressure line, a restrictor can be arranged after the air dryer a known manner in the air admission direction.

To ensure that this restrictor does not impair control of the respective air mass flow via the level control valves, however, the cross-sectional area of this restrictor is larger than the sum of the nozzle cross-sectional areas of the relevant first level control valves and of the restrictor cross-sectional areas of the restrictors arranged after the relevant second level control valves. This condition is met when the equation $(NW_Z > (n_{FB} * (NW_X^2 + NW_D^2))^{0.5})$ is satisfied, wherein $NW_X$ denotes the nominal size of the first level control valves, $NW_D$ denotes the nominal size of the restrictors arranged after the second level control valves, $NW_Z$ denotes the nominal size of the restrictor arranged after the air dryer, and $n_{FB}$ denotes the number of spring bellows. If the first level control valves have a nominal size of $NW_X = 8$ mm and the restrictors arranged after the second level control valves have a nominal size of $NW_D = 8$ mm, and two spring bellows of pneumatic springs arranged on a vehicle axle are present ($n_{FB} = 2$), the nominal size of the restrictor $NW_Z$ arranged after the air dryer should thus be greater than 13.3 mm ($NW_Z > 13.3$ mm) in order to avoid unwanted restriction of the air mass flow there.

To control a pneumatic suspension system of a motor vehicle during admission of air to and venting of air from spring bellows that are associated at least with the pneumatic springs arranged on one vehicle axle or on one vehicle side, the bellows can be connected by means of two parallel connection lines that are each provided with a level control valve to a main pressure line, and can be shut off with respect to same. The two respective level control valves of the relevant spring bellows have nozzle cross-sectional areas of the same size ($NW_X = NW_Y$), and a restrictor, the restrictor cross-sectional area $NW_D$ being smaller than the nozzle cross-sectional area $NW_Y$ of the associated level control valve ($NW_D < NW_Y$). In each case, the restrictor is arranged after one of the two level control valves in the air admission direction. The level control valve of the relevant spring bellows after which a restrictor is arranged is opened when lowering or raising the vehicle body slowly at at least one of the vehicle axles or on one vehicle side. The level control valve of the relevant spring bellows after which no restrictor is arranged is opened when lowering or raising the vehicle body at at least one of the vehicle axles or on one vehicle side with a medium actuating speed. Both level control valves of the relevant spring bellows are opened when lowering or raising the vehicle body quickly at at least one of the vehicle axles or on one vehicle side.

According to an embodiment of the present invention, the spring bellows of the pneumatic springs arranged at least on one vehicle axle can be connected to the main pressure line in parallel with the first connection line at least by means of a second connection line provided with a second level control valve and can be shut off with respect to the main pressure line. The second level control valve of the relevant spring bellows has a nozzle cross-sectional area of the same size as the first level control valve. And, a restrictor is arranged after the second level control valve in the air admission direction, the cross-sectional area of the restrictor being smaller than the nozzle cross-sectional area of the relevant second level control valve.

According to another embodiment of the present invention, a pneumatic suspension system for a motor vehicle has a plurality of spring bellows associated with the pneumatic springs of at least one vehicle axle. In contrast to other embodiments, however, a plurality of spring bellows, which are preferably associated with the pneumatic springs arranged on one vehicle axle, can be connected jointly by means of a connection line provided with a level control valve to a main pressure line and can be shut off with respect to same.

In order now to simply and economically set different air mass flows during admission of air to and venting of air from the spring bellows of pneumatic springs and, hence, set different raising and lowering speeds of the vehicle body at the relevant vehicle axle, the spring bellows of the pneumatic springs arranged at least on one vehicle axle can be connected to the main pressure line in parallel with the first connection line at least also by means of a second connection line provided with a second level control valve and can be shut off with respect to the main pressure line. For this purpose, the second level control valve of the relevant spring bellows has a nozzle cross-sectional area of the same size as the first level control valve, and a restrictor is arranged after the second level control valve in the air admission direction, the cross-sectional area of the restrictor being smaller than the nozzle cross-sectional area of the relevant second level control valve.

Since the air mass flow flowing through the second connection line when the second level control valve is open is determined by the restrictor, the air mass flow flowing to the spring bellows of the relevant pneumatic springs or flowing away from the bellows can thus be controlled in a simple manner in three stages by opening only the first level control valve, only the second level control valve or both level control valves.

To reduce the assembly effort, it is preferable that at least the two level control valves associated with the spring bellows of the pneumatic springs of a vehicle axle, and the restrictor arranged after the relevant second level control valve are arranged in a common valve block.

The valve block is preferably provided with a connection cap, which has a connection bore for direct connection of the first level control valve to the associated spring bellows, an end cap instead of a connection bore for direct connection of the second level control valve to an associated spring bellows, and a restrictor embodied as a restriction bore for connection, in a manner restricted on the bellows side, of the second level control valve to the connection bore of the first level control valve. In this way, the valve arrangement can also be implemented in a particularly simple and low-cost manner.

In order to avoid an unwanted restricting effect of the restrictor arranged after an air dryer in the air admission direction, the restrictor cross-sectional area thereof should be larger than the sum of the nozzle cross-sectional areas of the relevant first level control valve and of the restrictor cross-sectional area of the restrictor arranged after the relevant second level control valve. This condition is met when the equation $(NW_Z > (NW_X^2 + NW_D^2))^{0.5})$ is satisfied, wherein $NW_X$ denotes the nominal size of the first level control valve, $NW_D$ denotes the nominal size of the restrictor arranged after the second level control valve and $NW_Z$ denotes the nominal size of the restrictor arranged after the air dryer. If the first level control valve has a nominal size of $NW_X=8$ mm and the restrictor arranged after the second level control valve has a nominal size of $NW_D=5$ mm, the nominal size of the restrictor $NW_Z$ arranged after the air dryer should thus be greater than 9.4 mm ($NW_Z>9.4$ mm) in order to avoid unwanted restriction of the air mass flow there.

To control a pneumatic suspension system of a motor vehicle during admission of air to and venting of air from spring bellows that are associated at least with the pneumatic springs arranged on one vehicle axle, the spring bellows can be connected jointly by means of two parallel connection lines that are each provided with a level control valve to a main pressure line, and can be shut off with respect to same. The two level control valves of the relevant spring bellows have nozzle cross-sectional areas of the same size, and a restrictor, the restrictor cross-sectional area being smaller than the nozzle cross-sectional area of the associated level control valve. The restrictor is arranged after one of the two level control valves in the air admission direction. The level control valve of the spring hello after which the restrictor is arranged is opened when lowering or raising the vehicle body slowly at the relevant vehicle axle. The level control valve of the spring bellows after which no restrictor is arranged is opened when lowering or raising the vehicle body at the relevant vehicle axle with a medium actuating speed. Both level control valves of the spring bellows are opened when lowering or raising the vehicle body quickly at the relevant vehicle axle.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constrictions herein set forth, and the scope of the invention will be indicated in the claims.

BRIEF DESCRIPTION OF THE DRAWINGS

The inventive embodiments are discussed in greater detail below with reference to the accompanying drawings, in which.

REFERENCE CHARACTERS

1a -1f pneumatic suspension system
2 first filter
3 first check valve
4 electric motor
5 compressor
6 second check valve
7 air dryer
8 restrictor
9 supply line
10 discharge valve
11 vent line
12 second filter
13 electrical control line
14 pilot valve
15 pneumatic control line
16 unpressurized segment
17 electrical control line
18 compressor module
19 rapid discharge valve
20 rapid vent line
21 electrical control line
22 main pressure line
23 spring bellows
24 spring bellows
25 first level control valve
26 first level control valve
27 second level control valve
28 second level control valve
29 first connection line
30 first connection line
31 second connection line
32 second connection line
33 pressure accumulator
34 accumulator valve
35 connection line
36 electrical control line
37 electrical control line
38 electrical control line
39 electrical control line
40 electrical control line
41 pressure sensor
42 sensor line
43 displacement sensor
44 displacement sensor
45 sensor line
46 sensor line
47 triple valve block
48 fourfold valve block
49 fivefold valve block
50 control unit
51 restrictor
52 restrictor
60 distributor line
61a valve arrangement
61b valve arrangement
62 spring bellows
63 spring bellows
64 connecting line
65 first level control valve
66 second level control valve
67 first connection line 68 second connection line
69 main pressure line
70 electrical control line
71 electrical control line
72 restrictor
73 double valve block
74 level control valve
75 level control valve
76 connection line
77 connection line
78 connecting line
79 transverse restrictor
80 double valve block
81 triple valve block
82 switching valve, seat valve
83 switching valve, scat valve, first level control valve
84 switching valve, seat valve, second level control valve
85 pilot valve
86 first pilot valve
87 second pilot valve
88 control piston
89 first control piston
90 second control piston
91 housing
92 vertical bore
93 first vertical bore
94 second vertical bore
95 horizontal bore, main pressure duct
96 cap
97 connection bore
98 connection bore
99 filter
100 connection bore
101 restrictor, restriction bore
102 end cap
103 connection cap
$A_D$ nozzle cross-sectional area, restrictor cross-sectional area
$n_{FB}$ number of spring bellows
$NW_A$ nominal size of nozzle cross-sectional area of discharge valve 10
$NW_D$ nominal size of cross-sectional area of restrictors 51, 52, 72, 101
$NW_S$ nominal size of nozzle cross-sectional area of accumulator valve 34
$NW_X$ nominal size of nozzle cross-sectional area of valves 25, 26, 65, 83
$NW_Y$ nominal size of nozzle cross-sectional area of valves 27, 28, 66, 84
$NW_Z$ nominal size of nozzle cross-sectional area of restrictor 8

DETAILED DESCRIPTION OF THE PREFERRED EMBODIMENTS

Figure 3:
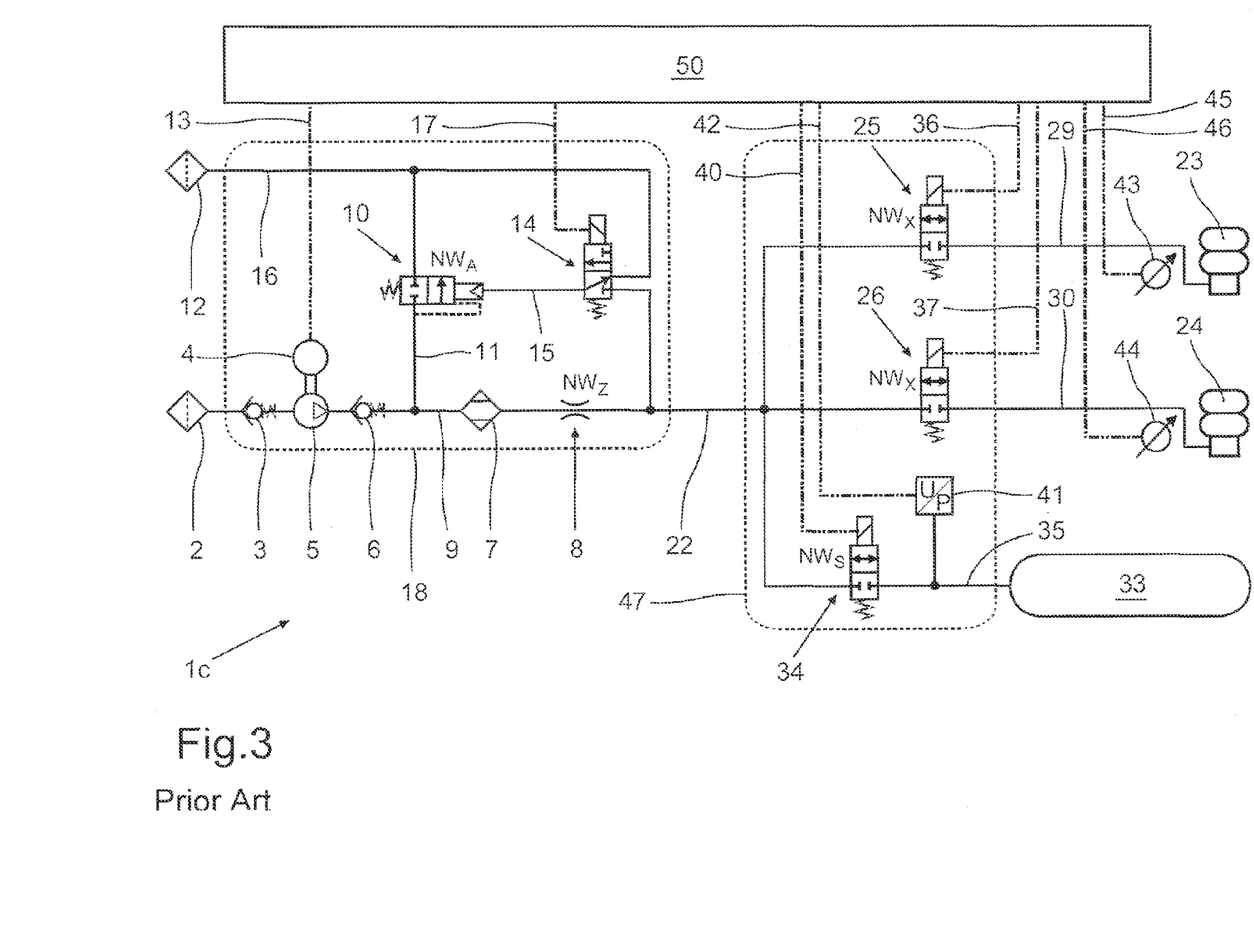
FIG. 3 shows a known first pneumatic suspension system of a motor vehicle.

By way of example, a known pneumatic suspension system 1c for a motor vehicle, which is shown in schematic form in FIG. 3, has two spring bellows 23, 24 that are associated with the two pneumatic springs of a vehicle axle, which can be connected by means of respective connection lines 29, 30 that are each provided with a level control valve 25, 26 to a main pressure line 22, and which can be shut off with respect to same. The level control valves 25, 26 are designed as 2/2-way solenoid switching valves which, in a first position (rest position), are closed and, in a second position (actuated position), are each open with a nozzle cross-sectional area of nominal size $NW_X$.

A pressure accumulator 33 can be connected by means of a connection line 35 provided with an accumulator valve 34 to the main pressure line 22 and can be shut off with respect to same. The accumulator valve 34 is designed as a 2/2-way solenoid switching valve, which, in a first position (rest position), is closed and, in a second position (actuated position), is open with a nozzle cross-sectional area of nominal size $NW_S$.

The electromagnets of the two level control valves 25, 26 and of the accumulator valve 34 are connected to an electronic control unit 50 by associated electrical control lines 36, 37, 40. A pressure sensor 41 for detecting the accumulator pressure prevailing in the pressure accumulator 33 is connected to connection line 35 between the pressure accumulator 33 and the accumulator valve 34. The pressure sensor 41 is connected to the con unit 50 by a sensor line 42. Respective displacement sensors 43, 44 for detecting the body level in the region of the relevant vehicle axle are arranged close to the pneumatic springs having the spring bellows 23, 24. These sensors are connected to the control unit 50 by respective sensor lines 45, 46. By way of example, the two level control valves 25, 26, the accumulator valve 34 and the pressure sensor 41 are arranged in a triple valve block 47.

The main pressure line 22 can be supplied with air via a supply line 9 provided with a first filter 2 arranged on the inlet side, a first check valve 3, a compressor 5 that can be driven by an electric motor 4, a second check valve 6, an air dryer 7 and a restrictor 8 arranged after the latter in the air admission direction and having restrictor cross-sectional area of nominal size $NW_Z$. The main pressure line can be vented via a vent line 11 that branches off between the second check valve 6 and the air dryer 7, is provided with a discharge valve 10 and has a second filter 12 arranged at the end, which also acts as a muffler. The electric motor 4 of the compressor 5 is connected to a power supply and, via an electrical control line 13, to the control unit 50.

The discharge valve 10 is designed as a pressure-controlled 2/2-way switching valve having a nozzle cross-sectional area of nominal size $NW_A$ which, in a first position (rest position), is closed and, in a second position (actuated position), is open, and which has a pressure limiting function for the pressure prevailing in the supply line 9. The pilot valve 14 associated with the discharge valve 10 is designed as a 3/2-way solenoid switching valve, which, in a first position (rest position), connects the relevant pneumatic control line 15 to the permanently unpressurized segment 16 of the vent line 11 and, in a second position (actuated position), connects it to the main pressure line 22. The electromagnet of the pilot valve 14 is connected to the control unit 50 by an electrical control line 17. By way of example, the two check valves 3 and 6, the compressor 5 with the associated electric motor 4, the air dryer 7, the restrictor 8 and the discharge valve 10 with the associated pilot valve 14 are combined in a compressor module 18.

The spring bellows 23, 24 can be supplied with air by means of the compressor 5, from the pressure accumulator 33 or simultaneously from both pressure sources. When the spring bellows 23, 24 are supplied with air by means of the compressor 5, the compressor is driven by the electric motor 4 and, via the supply line 9, delivers compressed air from the environment into the main pressure line 22 via the filter 2, the two check valves 3 and 6, the air dryer 7 and the restrictor 8. As the compressed air flows through the air dryer 7, which preferably contains regenerable silicate granules, it is dehumidified, this being intensified by the pressure rise ahead of the restrictor 8. From the main pressure line 22, the compressed air flows via the connection lines 29, 30 and the open level control valves 25, 26 into the spring bellows 23, 24.

When the spring bellows 23, 24 are supplied with air from the pressure accumulator 33, the compressed air, which is stored there under high pressure, flows via a connection line 35 and the open accumulator valve 34 into the main pressure line 22 and, from there, via the connection lines 29, 30 and the open level control valves 25, 26 into the spring bellows 23, 24.

When the spring bellows 23, 24 are vented, the compressed air flows out of the spring bellows 23, 24, via the connection lines 29, 30 and the open level control valves 25, 26 into the main pressure line 22 and, from there, via the restrictor 8, the air dryer 7, the vent line 11, the open discharge valve 10 and the filter 12 also acting as a muffler into the environment. As the previously dried compressed air flows through the air dryer 7, it absorbs moisture from the silicate granules, thereby regenerating the air dryer 7. The regeneration of the air dryer 7 is intensified by the pressure drop of the compressed air across the restrictor 8.

The discharge valve 10 is opened by connecting the associated pneumatic control line 15, which, in the unactuated state of the pilot valve 14, is connected to the permanently unpressurized segment 16 of the vent line 11, to the pressurized main pressure line 22 by switching over the pilot valve 14. Thus, the discharge valve 10 remains open until the pressure prevailing in the main pressure line 22 falls below a minimum value or the pilot valve 14 is switched to the rest position.

From the structure and the functional description of the known pneumatic suspension system 1c shown in FIG. 3, it is evident that the air mass flow during admission of air to and venting of air from the spring bellows 23, 24, and hence the actuating speed during the raising and lowering of the vehicle body at the relevant vehicle axle, is controlled only inadequately, i.e., has an inadequate height adjustment capability. While air mass flow during air admission to the spring bellows 23, 24 can be influenced to a limited extent by the pressure set in the main pressure line 22, the air mass flow during the venting of the spring bellows 23, 24 automatically results essentially from the pressure prevailing in the spring bellows 23, 24 and the flow resistances of the level control valves 25, 26, the restrictor 8, the air dryer 7, the discharge valve 10 and the second filter 12.

Figure 4:
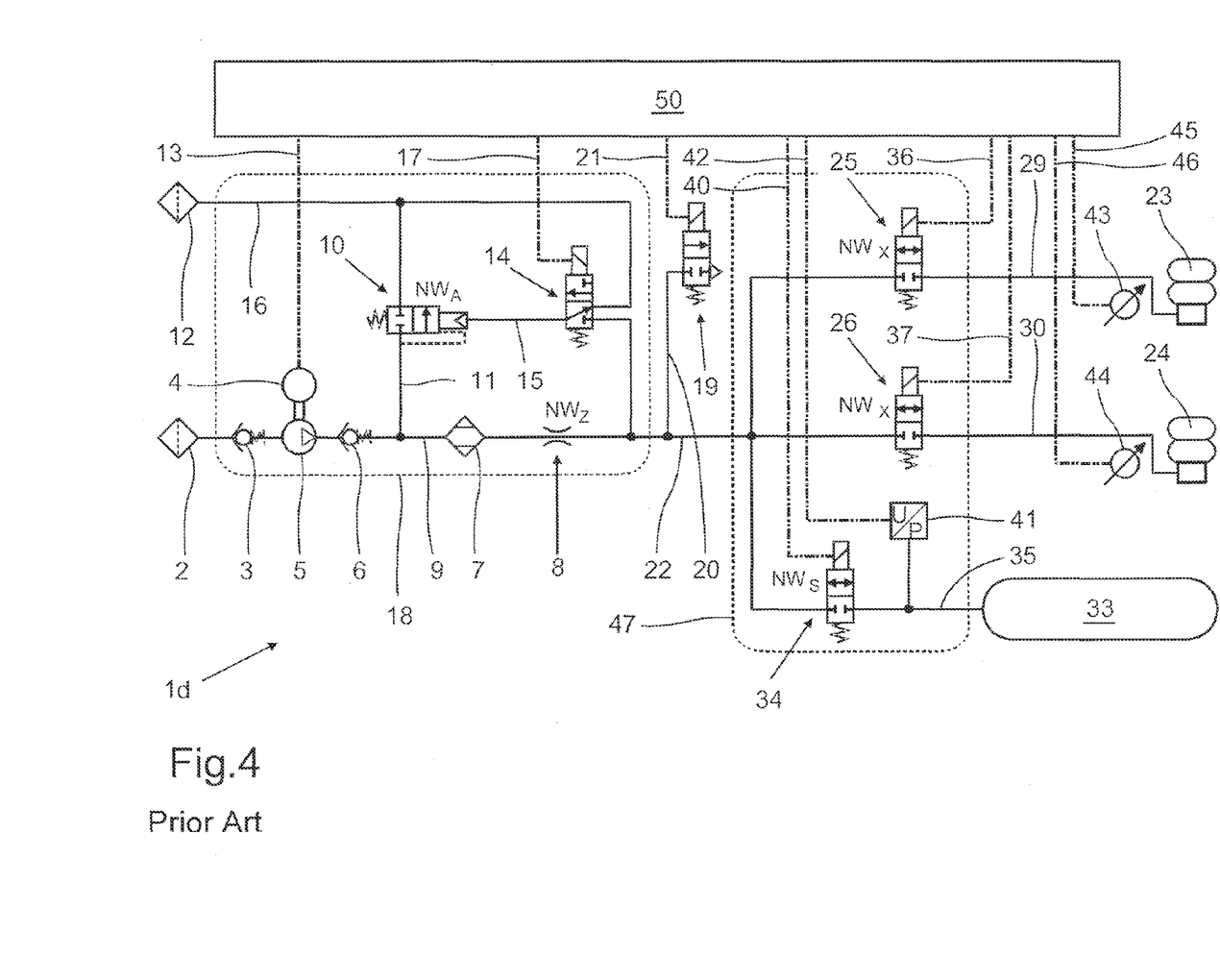
FIG. 4 shows a known second pneumatic suspension system of a motor vehicle.

To at least partially eliminate this disadvantage, a rapid discharge valve 19 is additionally provided in the known pneumatic suspension system 1d (the system being illustrated schematically in FIG. 4 and largely corresponding to the pneumatic suspension system 1c shown in FIG. 3). This rapid discharge valve 19 is designed as a 2/2-way solenoid switching valve, by means of which a rapid vent line 20 connected to the main pressure line 22 is shut off in a first position (rest position) and connected to the environment in a second position (actuated position). The electromagnet of the rapid discharge valve 19 is connected to the control unit 50 by an electrical control line 21. By opening the rapid discharge valve 19, it is thus possible to allow compressed air to flow out of the main pressure line 22 and, if the level control valves 25, 26 are open, also out of the spring bellows 23, 24 into the environment while bypassing the restrictor 8, the air dryer 7, the discharge valve 10 and the filter 12, and hence to bring about rapid lowering of the vehicle body at the relevant vehicle axle. However, the disadvantage of this is that the compressed air previously dried during air admission to the spring bellows 23, 24 escapes unused, and, as a result, the air dryer 7 or the silicate granules therein are not regenerated.

Figure 1:
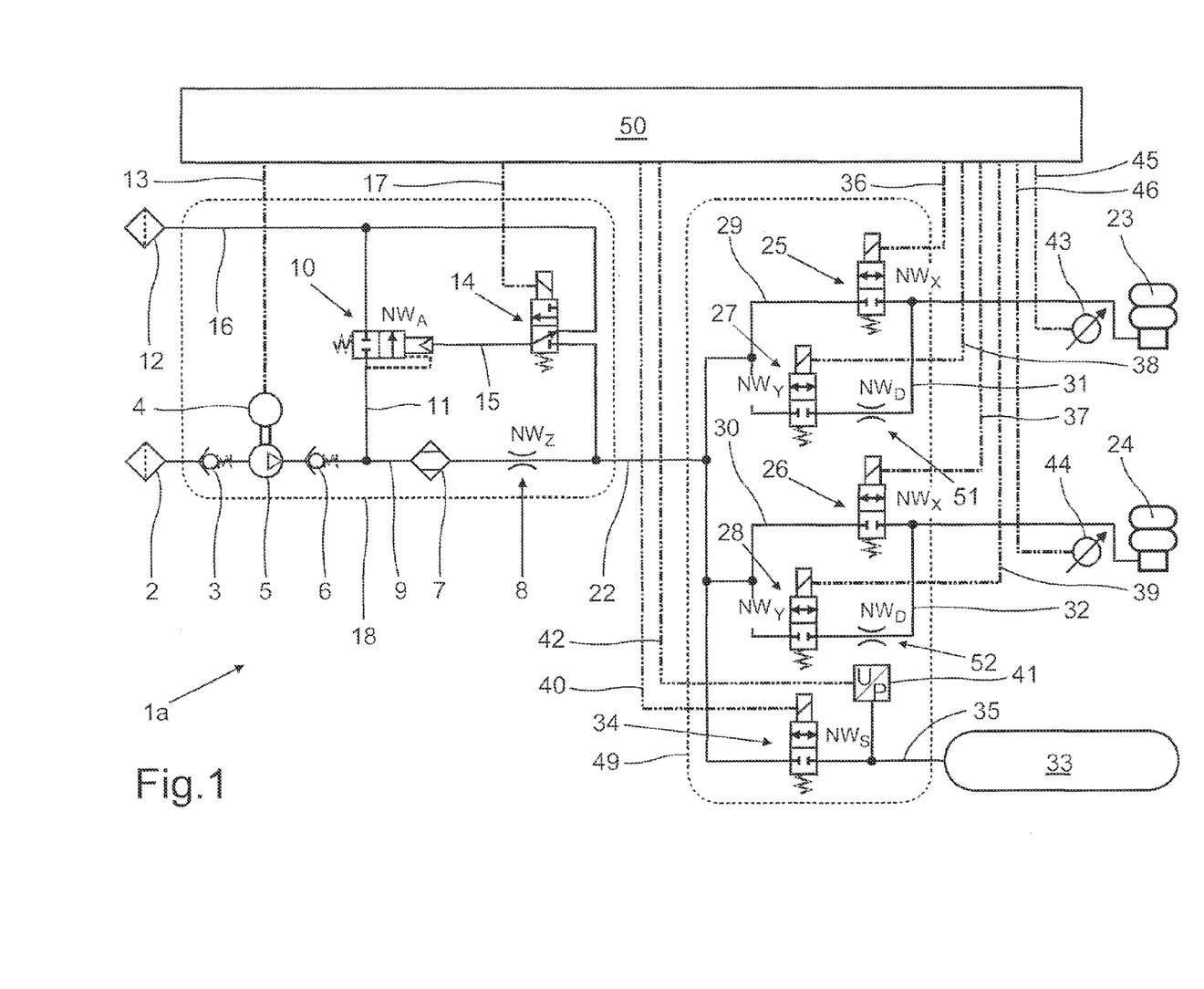
FIG. 1 shows a first embodiment of a pneumatic suspension system according to the invention for a motor vehicle.

In contrast, a first embodiment of a pneumatic suspension system 1a designed in accordance with the invention, which is illustrated in schematic form in FIG. 1 and is based on the pneumatic suspension system 1e shown in FIG. 3, has an easily and inexpensively implemented solution for improving the controllability of the air mass flow during admission of air to and venting of air from the pneumatic spring bellows 23, 24. For this purpose, a second connection line 31, 32 provided with a respective second level control valve 27, 28 is arranged between the main pressure line 22 and the respectively associated spring bellows 23, 24, in parallel with the first connection lines 29, 30, which are each provided with a first level control valve 25, 26. The second level control valves 27, 28 are of identical construction to the first level control valves 25, 26, i.e., are designed as 2/2-way solenoid switching valves, which, in a first position (rest position), are closed and, in a second position (actuated position), are each open with a nozzle cross-sectional area of nominal size $NW_Y$.

According to the inventive embodiment, the second level control valves 27, 28 correspond exactly to the first level control valves 25, 26, i.e., the nozzle cross-sectional areas of the second level control valves 27, 28 or nominal sizes $NW_Y$ thereof are the same as the nozzle cross-sectional areas of the first level control valves 25, 26 or nominal sizes $NW_X$ thereof ($NW_Y=NW_X$). However, respective restrictors 51, 52 with a nozzle cross-sectional area of nominal size $NW_D$, which is smaller than the nominal size $NW_Y$ of the respectively associated second level control valve 27, 28 ($NW_D<NW_Y$), are arranged after the second level control valves 27, 28 he air admission direction. Consequently, when the second level control valves 27, 28 are open, the air mass flow in the second connection lines 31, 32 is restricted by the respective restrictors 51, 52 or the restrictor cross-sectional areas thereof and not by the nozzles of the relevant level control valves 27, 28 or nozzle cross-sectional areas thereof. The electromagnets of the second level control valves 27, 28 are connected to the control unit 50 by respective associated electrical control lines 38, 39.

Through the single or combined opening of the level control valves 25, 27 and 26, 28 respectively associated with one spring bellows 23, 24, it is thus possible to expose several nozzle or restrictor cross-sectional areas and consequently to set different air mass flows during admission of air to and venting of air from the spring bellows 23, 24, By opening just one of the two level control valves (25 or 27; 26 or 28) and by opening both level control valves (25 and 27; 26 and 28) in each case, it is accordingly possible to effectively expose three nozzle restrictor cross-sectional areas of different sizes and hence to set three raising and lowering speeds for the vehicle body at the relevant vehicle axle. In the pneumatic suspension system 1a according to an embodiment of the present invention, which is shown in FIG. 1, the level control valves 25, 26, 27, 28, the accumulator valve 34 and the pressure sensor 41 can be combined in a fivefold valve block 49, by way of example.

Owing to the improvement in controllability of the pneumatic suspension system 1a by virtue of the embodiment according to the invention, it is possible to dispense with the pressure accumulator 33, the associated accumulator valve 34 and the pressure sensor 41 if required. A correspondingly simplified second embodiment of the pneumatic suspension system 1b according to the invention is shown in schematic form in FIG. 2. Owing to the saving of components, the level control valves 25, 26, 27, 28 are then combined in a fourfold valve block 48, by way of example.

Figure 5:
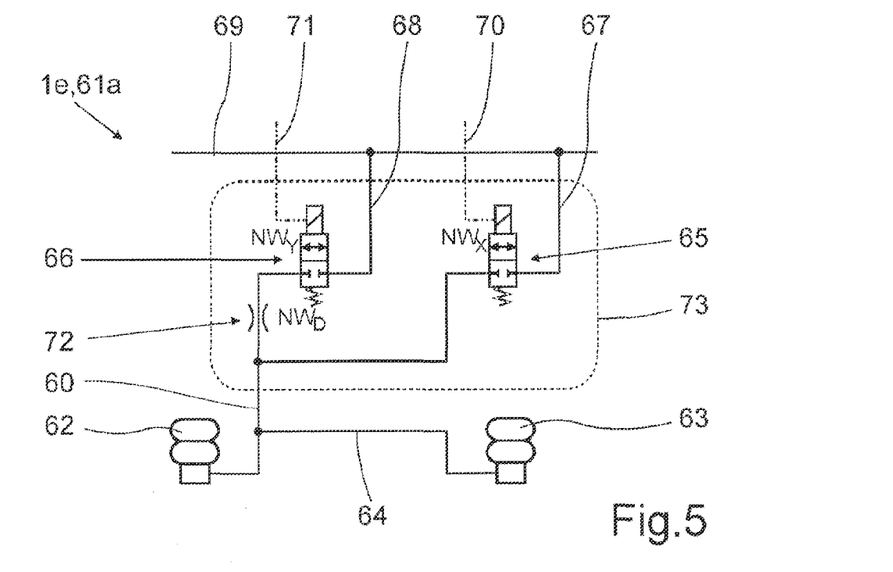
FIG. 5 shows the valve arrangement of a third embodiment of a pneumatic suspension system according to the invention for a motor vehicle.

In a valve arrangement 61a of a pneumatic suspension system 1e according to the embodiment of the present invention for a motor vehicle depicted in schematic form in FIG. 5, two spring bellows 62, 63 associated with the two pneumatic springs of a vehicle axle are connected to one another directly by a connecting line 64. The two spring bellows 62, 63 can be connected jointly to a main pressure line 69 and shut off from same by means of two parallel connection lines 67, 68, each provided with a level control valve 65, 66.

The two level control valves 65, 66 can be designed as 2/2-way solenoid switching valves which, in a first position (rest position), are closed and, in a second position actuated position), are open with a nozzle cross-sectional area of nominal size $NW_X$ and $NW_Y$ respectively. The electromagnets of the two level control valves 65, 66 are connected to an electronic control unit by associated electrical control lines 70, 71.

The nozzle cross-sectional areas of the two level control valves 65, 66 or the nominal sizes $NW_X$, $NW_Y$ can be made the same ($NW_X=NW_Y$), this being associated with cost advantages for procurement and logistics. However, a restrictor 72, the restrictor cross-sectional area or nominal size $NW_D$ of which is smaller than the nozzle cross-sectional area or nominal size $NW_Y$ of the associated level control valve 66 ($NW_D<NW_Y$), is arranged after the second of the two level control valves 66 in the air admission direction. The level control valves 65, 66 and the restrictor 72 are combined in a double valve block 73, by way of example.

Through the single or combined opening of the level control valves 65, 66 associated with the two spring bellows 62, 63, it is thus possible to expose several nozzle or restrictor cross-sectional areas and consequently to set different air mass flows during admission of air to and venting of air from the spring bellows 62, 63. By opening just one of the two level control valves (65 or 66) and by opening both level control valves (65 or 66) in each case, it is accordingly possible to effectively expose three nozzle or restrictor cross-sectional areas of different sizes and hence to set three raising and lowering speeds for the vehicle body at the relevant vehicle axle.

Figure 7A:
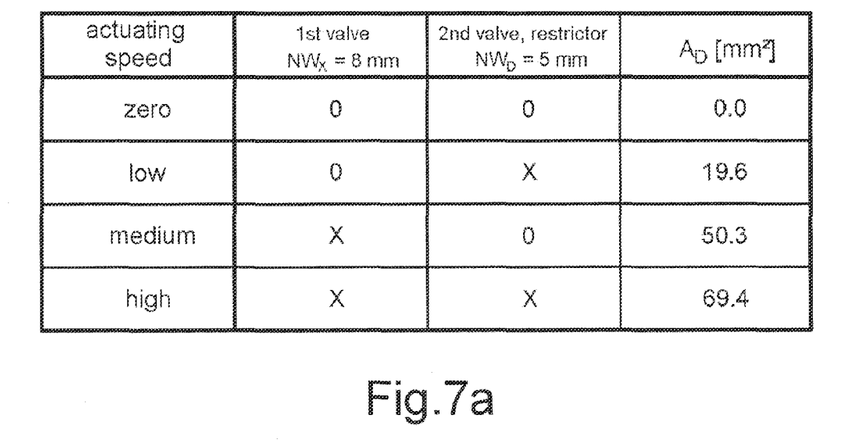
FIG. 7a shows the connection diagram for the pneumatic suspension system according to the invention shown in FIG. 5, in the form of a table.
Figure 7B:
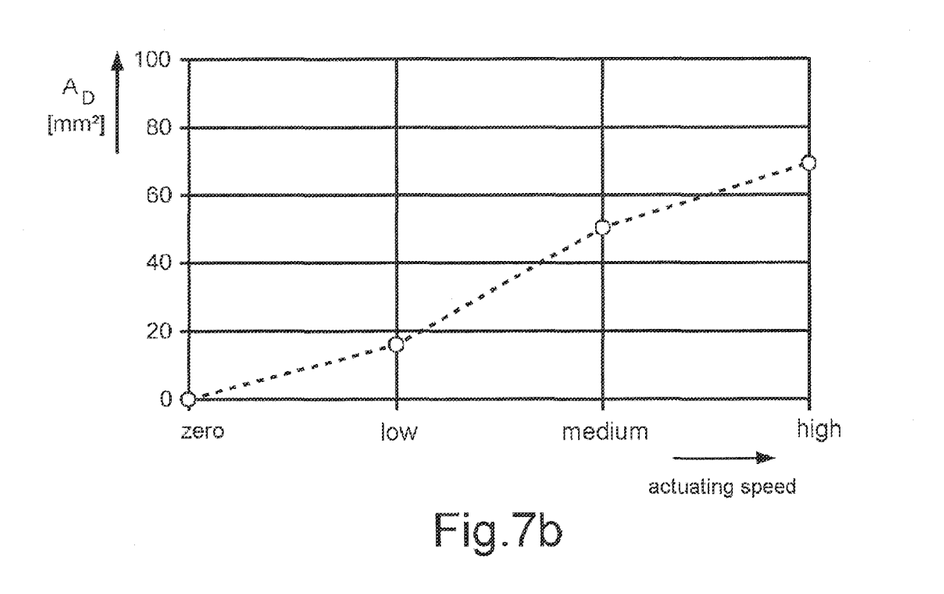
FIG. 7b shows the connection diagram of the pneumatic suspension system according to the invention shown in FIG. 5, in the form of a diagram.

In an example of use on the rear axle of a heavy commercial vehicle, the nominal size $NW_X$ of the nozzle cross-sectional area $A_D$ in the first level control valve 65 is an assumed 8 mm ($NW_X=8$ mm) and the nominal size $NW_D$ of the restrictor cross-sectional area $A_D$ in the restrictor 72. arranged after the second level control valve 66 is an assumed 5 mm ($NW_D=5$ mm), The three nozzle or restrictor cross-sectional areas of different sizes that can be set in this illustrative embodiment ($A_D=19.6$ mm$^2$, $A_D=50.3$ mm$^2$, $A_D=69.4$ mm$^2$) are illustrated in the form of a connection diagram in the table in FIG. 7a and in the form of a diagram in FIG. 7b.

Figure 6:
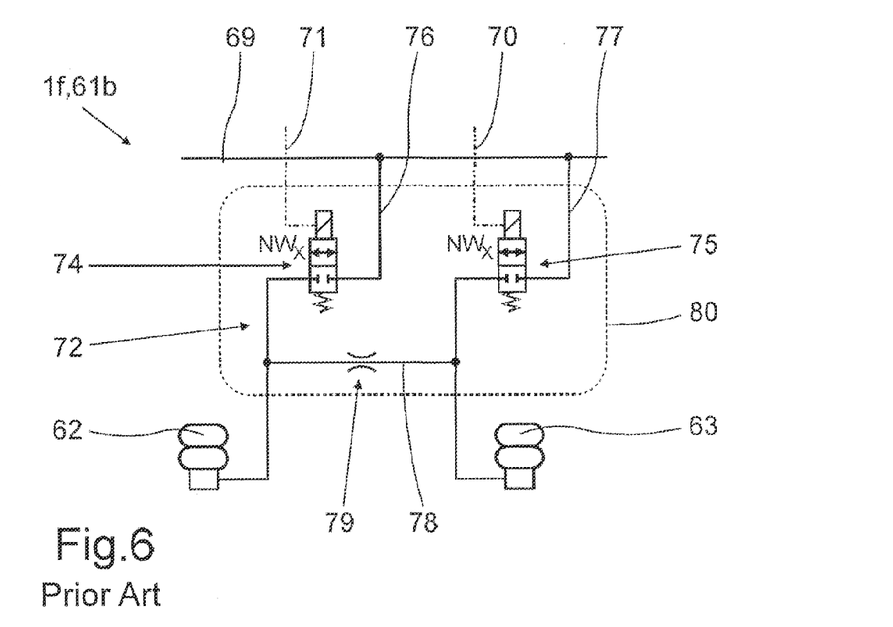
FIG. 6 shows the valve arrangement of a known third pneumatic suspension system of a motor vehicle.

The valve arrangement 61a shown in FIG. 5 can be derived without significant additional effort from a valve arrangement 61b in a known pneumatic. suspension system if for a motor vehicle, which is shown in FIG. 6. In this known pneumatic suspension system if, both spring bellows 62, 63 of a vehicle axle are connected to the main pressure line 69 by a connection line 76, 77 provided with a level control valve 74, 75, and the two spring bellows 62, 63 are connected to one another by a connecting line 78 and a transverse restrictor 79 arranged therein. The level control valves 74, 75 and the connecting line 78 with the transverse restrictor 79 are combined in a double valve block 80, by way of example.

In this known valve arrangement 61b, only one nozzle cross-sectional area of nominal size $NW_X$ has to be opened by means of the respectively associated level control valve 74, 75 for each of the two spring bellows 62, 63 and hence, in principle, only a single raising and lowering speed of the vehicle body at the relevant vehicle axle can be set. However, the separate connectability of the two spring bellows 62, 63 with a pressure source and a pressure sink and the restricted connection thereof via the transverse restrictor 79 means that it is advantageously possible with this valve arrangement 61b to equalize the body level if there is unequal load distribution between the sides.

In order to create the valve arrangement 61a according to the embodiment of the present invention shown in FIG. 5 from the known valve arrangement 61b shown in FIG. 6, only slight modifications are required in terms of production, in particular there is no need for an additional switching valve within and outside the relevant valve block 80. Thus, a restrictor 72 is arranged after one level control valve 66 in the air admission direction, and the connection line 68 of this level control valve 66 is combined with the connection line 67 of the other level control valve 65 after the restrictor 72. Moreover, the restricted cross connection of the spring bellows 62, 63 via the connecting line 78 and the transverse restrictor 79 in the known valve arrangement 61b shown in FIG. 6 is replaced by direct connection of the spring bellows 62, 63 by the connecting line 64 in the inventive valve arrangement 61a shown in FIG. 5. Valve arrangement 61a therefore has the advantage that the double valve block 73 accommodating the two level control valves 65, 66 and the restrictor 72 requires only a single connection for a distributor line 60 leading to both spring bellows 62, 63.

The valve arrangement 61a shown in FIG. 5 furthermore has the advantage over the known valve arrangement 61b shown in FIG. 6 of having three raising and lowering speeds for the vehicle body that can be set at the relevant vehicle axle. However, there is no longer the possibility of restricted equalization of the body level in the event of unequal load distribution between the sides.

Figure 2:
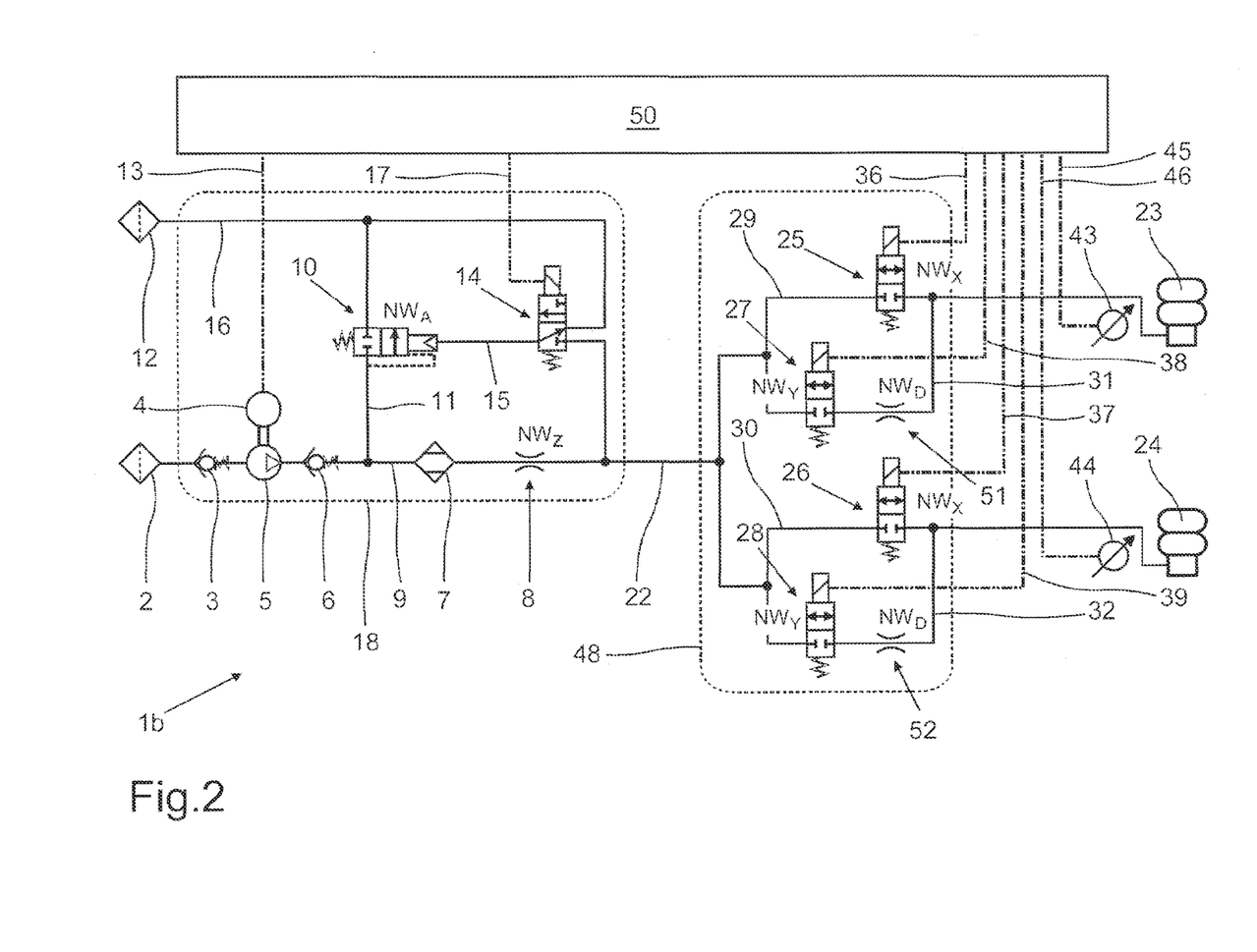
FIG. 2 shows a second embodiment of a pneumatic suspension system according to the invention for a motor vehicle.
Figure 8:
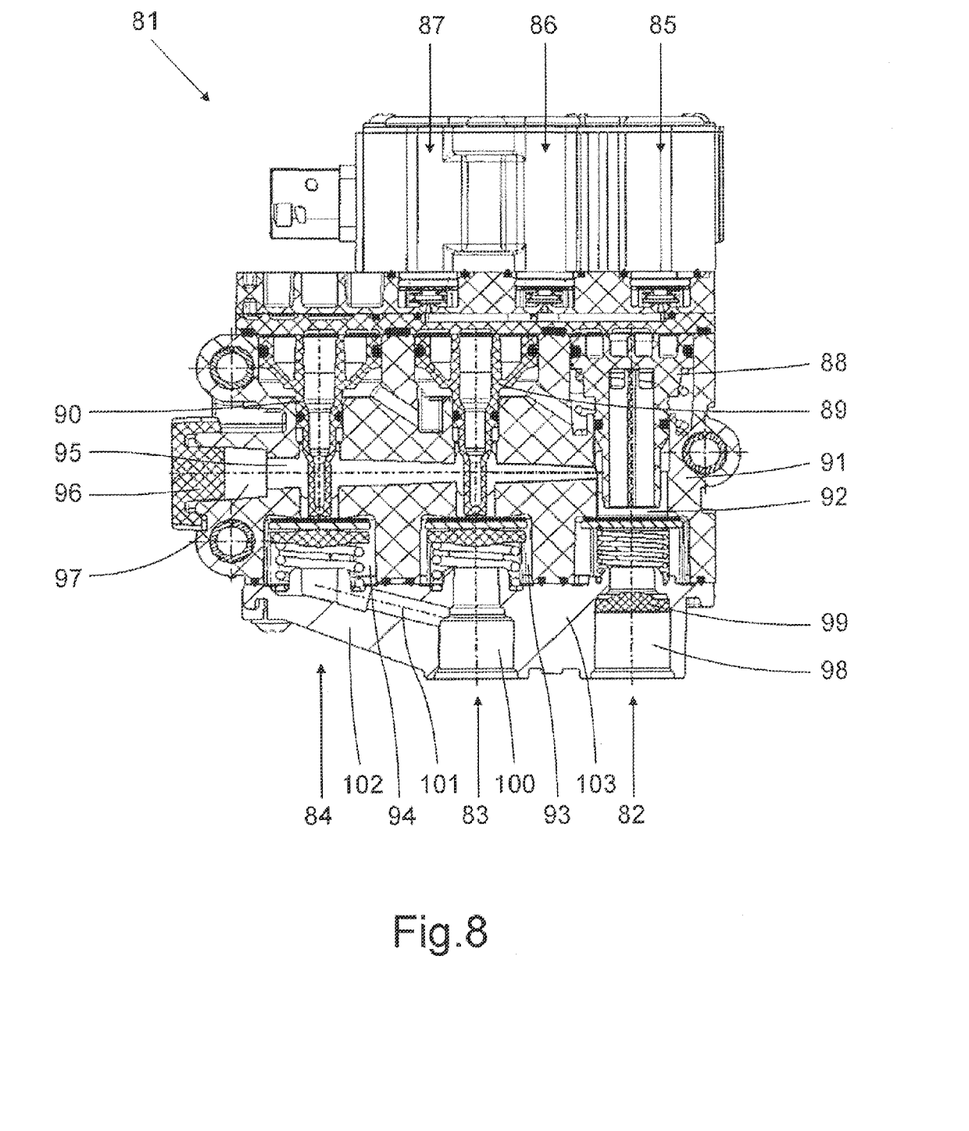
FIG. 8 shows a preferred embodiment of a valve block of the pneumatic suspension system according to the invention shown in FIGS. 1, 2 and 5.

A preferred practical embodiment of the inventive valve arrangements for the pneumatic spring systems 1a and 1b in FIGS. 1 and 2 and of the valve arrangement 61a shown in FIG. 5 is illustrated by way of example by means of a triple valve block 81 in the sectional view in FIG. 8, but it can also be implemented in the same way in a twin, fourfold or fivefold valve block.

In the valve block 81 shown in FIG. 8, three switching valves 82, 83, 84, which are designed as pilot-controlled seat valves by way of example, are arranged so as to be axially parallel. The switching valves 82, 83, 84 can each be controlled by a respective pilot valve 85, 86, 87, designed as a 3/2-way solenoid switching valve, by means of a respective associated control piston 88, 89, 90, by a process in which this control piston is, in each case, acted upon by the associated pilot valve 85, 86, 87 with a low pressure (ambient pressure) in a first position (rest position) and with a high pressure (main pressure) in a second position actuated position).

Pilot-controlled seat valves of this kind are preferably used when relatively large flow cross sections in combination with correspondingly high flow forces are to be switched, i.e., opened or closed, with a relatively low control current. This can also be the case with the pneumatic suspension systems 1a, 1b shown in FIGS. 1 and 2 and with the valve arrangement 61a shown in FIG. 5 if these are used on a heavy commercial vehicle.

The valve block 81 has a housing 91 with three stepped vertical bores 92, 93, 94 and with a horizontal bore 95 intersecting same. Arranged in each of the vertical bores 92, 93, 94 are the switching valves 82, 83, 84, designed as seat valves, and the control pistons 88, 89, 90 associated therewith. The horizontal bore 95 forms a main pressure duct, which corresponds to the main pressure line 22, 69 shown in FIGS. 1, 2 and 5 or is connected thereto. A connection bore 97 closed by a cap 96 in FIG. 8 enables a further valve block to be connected to the main pressure duct 95, for example.

The switching valve 82 depicted in FIG. 8 is designed as a 3/2-way switching valve, by means of which the main pressure duct 95 is connected to the environment, i.e., is depressurized, in a first position first position (rest position), in the installed state of the valve block 81, and is connected to a pressure accumulator connected to an associated connection bore 98 in a second position (actuated position). The switching valve 82 thus combines in itself, for example, the functions of the discharge valve 10 and of the accumulator valve 34 of the pneumatic suspension system 1a shown in FIG. 1. In the present case, a filter 99 is inserted into the connection bore 98 of the switching valve 82 for connection of the pressure accumulator.

The switching valve 83 arranged centrally in FIG. 8 is designed as a 2/2-way switching valve, by means of which an associated connection bore 100 provided for connection of at least one spring bellows, is shut off from the main pressure duct 95 in a first position (rest position) and is connected to the main pressure duct 95 in a second position (actuated position).

The switching valve 84 in FIG. 8 is likewise designed as a 2/2-way switching valve, by means of which the connection bore 100 of the central switching valve 83 is shut off from the main pressure duct 95 in a first position (rest position) and is connected to the main pressure duct 95 in a second position (actuated position) via a restrictor 101 embodied as a restriction bore.

Instead of a normally present connection bore of the left-hand switching valve 84, an end cap 102 can be provided. The restrictor 101 and the end cap 102 are integral components of a connection cap 103, which closes off the housing 91 of the valve block 81 at the bottom and in which the connection bores 98, 100 of the right-hand switching valve 82 and of the central switching valve 83 are arranged.

Functionally, the central switching valve 83 thus corresponds to one of the first level control valves 25, 26 of the pneumatic suspension systems 1a, 1b shown in FIGS. 1 and 2 and to the first level control valve 65 of the valve arrangement 61a shown in FIG. 5. The left-hand switching valve 84 with the restrictor 101 arranged after it in the air admission direction likewise corresponds to one of the second level control valves 27, 28 with the respective restrictor 51, 52 arranged after it in the air admission direction in the pneumatic suspension systems 1a, 1b shown in FIGS. 1 and 2 and to the second level control valve 66 with the downstream restrictor 72 of the valve arrangement 61a shown in FIG. 5.

The function of a first switchable unrestricted connection and of a second switchable restricted connection, parallel thereto, of an associated spring bellows (23; 24) or of a plurality of associated spring bellows (62, 63) to a main pressure line (22; 69) or a main pressure duct 95 is obtained in the present case in a particularly simple and low-cost manner by virtue of the fact that a connection cap, which is normally also provided with a connection bore for the left-hand switching valve 84, is replaced by the connection cap 103 designed according to the invention and provided with the restriction bore 101 and the end cap 102 for the left-hand switching valve 84.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A vehicle pneumatic suspension system, comprising spring bellows associated with pneumatic springs of at least one axle of a vehicle, the spring bellows being one of connected to and shut off from a main pressure line via first connection lines having first level control valves, the main pressure line being connectable alternately to a compressed air source and a compressed air sink by at least one valve, the spring bellows of ones of the pneumatic springs arranged at least on one of one axle of the vehicle and one side of the vehicle being connectable to the main pressure line in parallel with the first connection lines at least by second connection lines having second level control valves, the second level control valves of the spring bellows having nozzle cross-sectional areas of the same size as nozzle cross-sectional areas of the first level control valves; and restrictors arranged after the second level control valves in an air admission direction, the cross-sectional areas of the restrictors being smaller than the nozzle cross-sectional areas of the second level control valves.

2. The pneumatic suspension system as claimed in claim 1, wherein the restrictors and ones of the first level control valves and second level control valves associated with the spring bellows of one of the pneumatic springs are arranged in a common valve block.

3. The pneumatic suspension system as claimed in claim 2, wherein the valve block includes: a connection cap having a connection bore configured to connect one of the first level control valves to an associated one of the spring bellows, an end cap configured to connect a respective one of the second level control valves to an associated one of the spring bellows, and a restriction bore configured to connect the respective one of the second level control valves to the connection bore.

4. The pneumatic suspension system as claimed in claim 1, further comprising an air dryer, and a further restrictor arranged after the air dryer in an air admission direction, the further restrictor having a restrictor cross-sectional area that is larger than a sum of the nozzle cross-sectional areas of the first level control valves and of the restrictor cross-sectional areas of the restrictors arranged after the second level control valves.

5. A method for controlling a pneumatic suspension system of a motor vehicle during admission of air to and venting of air from spring bellows associated with pneumatic springs arranged on one of one axle and one side of the vehicle, the spring bellows being one of connected to and shut off from a main pressure line via parallel connection lines having level control valves, the level control valves of the spring bellows having nozzle cross-sectional areas of the same size, the pneumatic suspension system including restrictors arranged after one of the level control valves in an air admission direction, the restrictors having cross-sectional areas smaller than the nozzle cross-sectional areas of associated ones of the level control valves the method comprising opening the one of the level control valves of the ones of the spring bellows after which the restrictors are arranged when one of lowering and raising the vehicle slowly at one of (i) at least one of the axles of the vehicle and (ii) one vehicle side of the vehicle.

6. The method for controlling a pneumatic suspension system as claimed in claim 5, further comprising opening the one of the level control valves of the ones of the spring bellows after which none of the restrictors are arranged when one of lowering and raising the vehicle with a medium actuating speed at one of (i) at least one of the axles of the vehicle and (ii) one side of the vehicle.

7. The method for controlling a pneumatic suspension system as claimed in claim 5, further comprising opening all of the level control valves of the spring bellows when one of lowering and raising the vehicle quickly at one of (i) at least one of the axles of the vehicle and (ii) one side of the vehicle.

8. A vehicle pneumatic suspension system comprising spring bellows associated with pneumatic springs of at least one axle of a vehicle, the spring bellows being one of connected jointly to and shut off from a main pressure line via a first connection line having a first level control valve, the main pressure line being connectable alternately to a compressed air source and a compressed air sink by at least one valve, the spring bellows of ones of the pneumatic springs arranged at least on one axle of the vehicle being connectable to the main pressure line in parallel with the first connection line at least by a second connection line having a second level control valve, the second level control valve having a nozzle cross-sectional area of the same size as a nozzle cross-sectional area of the first level control valve; and a restrictor arranged after the second level control valve in an air admission direction, the restrictor having a cross-sectional area smaller than the nozzle cross-sectional area of the second level control valve.

9. The pneumatic suspension system as claimed in claim 8, wherein the restrictor and at least the first and second level control valves are arranged in a common valve block.

10. The pneumatic suspension system as claimed in claim 9, wherein the valve block includes: a connection cap having a connection bore to directly connect the first level control valve to an associated one of the spring bellows, an end cap to directly connect the second level control valve to an associated one of the spring bellows, and a restriction bore to connect the second level control valve to the connection bore.

11. The air suspension system as claimed in claim 8, further comprising an air dryer and a further restrictor arranged after the air dryer in an air admission direction, the further restrictor having a cross-sectional area larger than a sum of the nozzle cross-sectional area of the first level control valve and of the restrictor cross-sectional area of the restrictor arranged after the second level control valve.

12. A method for controlling a pneumatic suspension system of a motor vehicle during admission of air to and venting of air from spring bellows associated with pneumatic springs arranged on one axle of the vehicle, the spring bellows being one of connected jointly to and shut off from a main pressure line by parallel connection lines having level control valves, the level control valves having nozzle cross-sectional areas of the same size, the pneumatic suspension system including a restrictor arranged after one of the level control valves in an air admission direction, the restrictor having a cross-sectional area smaller than the nozzle cross-sectional area of the associated one of the level control valves, the method comprising opening the one of the level control valves after which the restrictor is arranged when one of lowering and raising the vehicle slowly at the vehicle axle.

13. The method as claimed in claim 12, further comprising opening the one of the level control valves of the spring bellows after which no restrictor is arranged when one of lowering and raising the vehicle at the vehicle axle with a medium actuating speed.

14. The method as claimed in claim 12, further comprising opening all the level control valves of the spring bellows when one of lowering and raising the vehicle quickly at the vehicle axle.

* * * * *